Aug. 22, 1950
C. R. HANNA ET AL
2,519,459
STABLE ELEMENT GYRO
Original Filed March 1, 1944
2 Sheets-Sheet 2
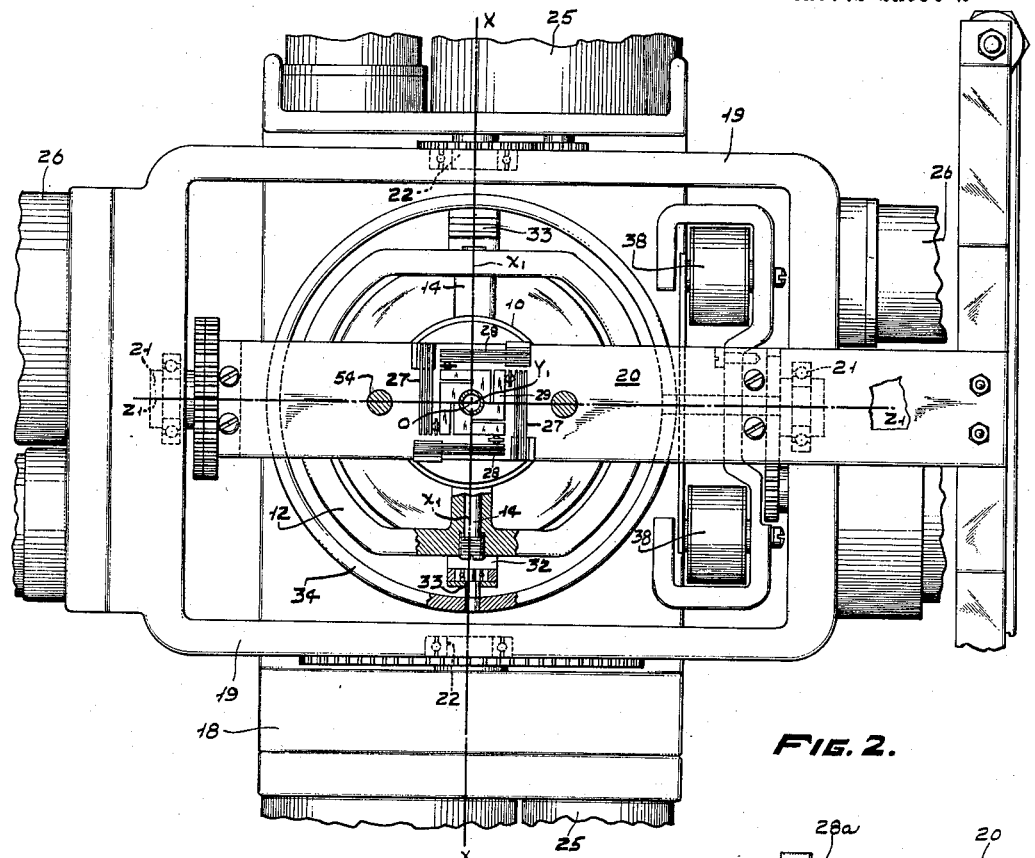
FIG. 2.
FIG. 4.
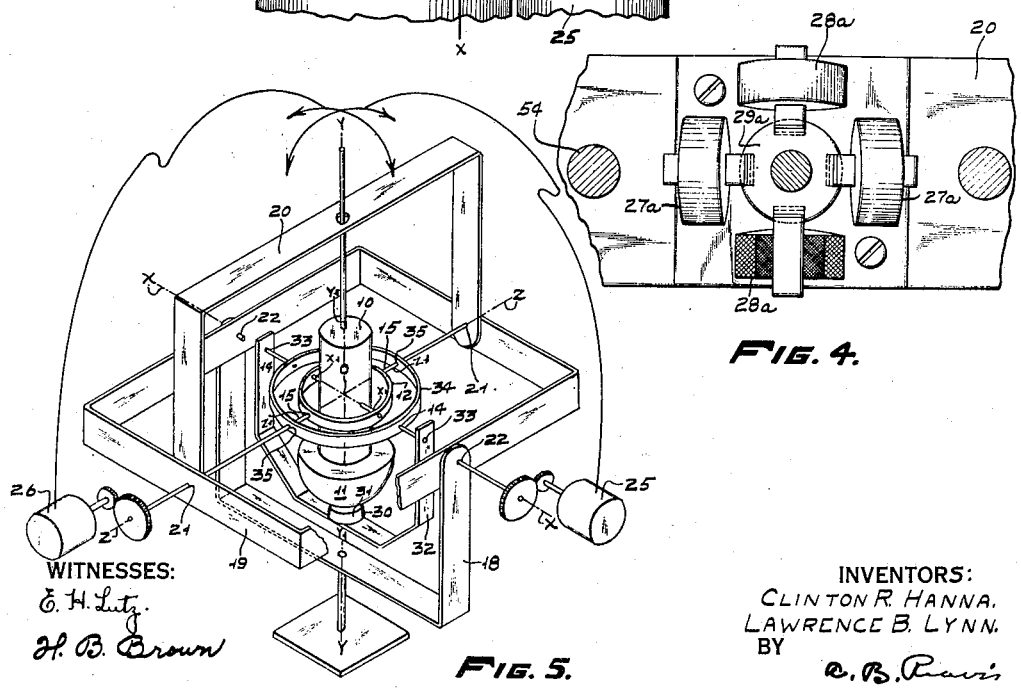
FIG. 5.
WITNESSES:
E. H. Lutz.
H. B. Brown
INVENTORS:
CLINTON R. HANNA,
LAWRENCE B. LYNN.
BY
R. B. Reavis
ATTORNEY Patented Aug. 22, 1950

2,519,459

UNITED STATES PATENT OFFICE 2,519,459

STABLE ELEMENT GYRO

Clinton R. Hanna, Pittsburgh, and Lawrence B. Lynn, Wilkinsburg, Pa., assignors to Westinghouse Electric Corporation, East Pittsburgh, Pa., a corporation of Pennsylvania Original application March 1, 1944, Serial No. 524,560. Divided and this application August 27, 1946, Serial No. 693,208

10 Claims. (Cl. 74—5.46)

This application is a division of our application Serial No. 524,560, filed March 1, 1944, Patent No. 2,457,228, granted December 28, 1948, for Stable Element and is concerned with the gyro and related features.

An object of the present invention is to provide improved means compensating for the effect of earth's rotation on a neutral gyro whose spin axis has a directional effect in relation to the earth.

A further object of the invention is to provide, with a neutral gyro having its rotor spin axis constrained to the vertical, means acting in a north-south plane to cause the gyro to precess in the east-west plane at the same rotational velocity as that of the earth and in the same direction as the latter so that the rotor spin axis may be maintained vertical.

Another object of the invention is to provide a neutral gyro having an improved magnetic erector together with means for compensating for the effect of earth's rotation.

A more particular object of the invention is to provide, with a neutral gyro, means responsive to gravity and acting on the gyro to cause the spin axis to seek a directional position in relation to the earth, together with means for applying torque to the gyro about an axis transverse to the spin axis and for maintaining the torque in a north-south plane to correct for the effect of earth's rotation on the gyro.

A further object of the invention is to provide a gyro-vertical wherein the gyro is acted upon by means responsive to gravity so that the spin axis seeks the vertical and the gyro is acted upon by magnetic means applying torque thereto in a north-south plane to correct for the effect of earth's rotation thereon.

A further object of the invention is to provide eddy current damping means for the pendulous suspension of the magnetic erector.

A further object of the invention is to provide a gyro having its spin axis constrained to vertical position together with a friction damper effective horizontally and rotationally to damp nutational oscillations.

These and other objects are effected by the invention as will be apparent from the following description and claims taken in connection with the accompanying drawings, forming a part of this application, in which:

Fig. 2 is a sectional view taken along the line II—II of Fig. 1;

Figs. 3 and 4 are detail views showing a modified form of the pick-up means operated by the gyro;

Fig. 5 is a diagram showing geometric relations of the structure shown;

Fig. 6 is a vertical diametrical sectional view of the nutational damper.

Figure 1:
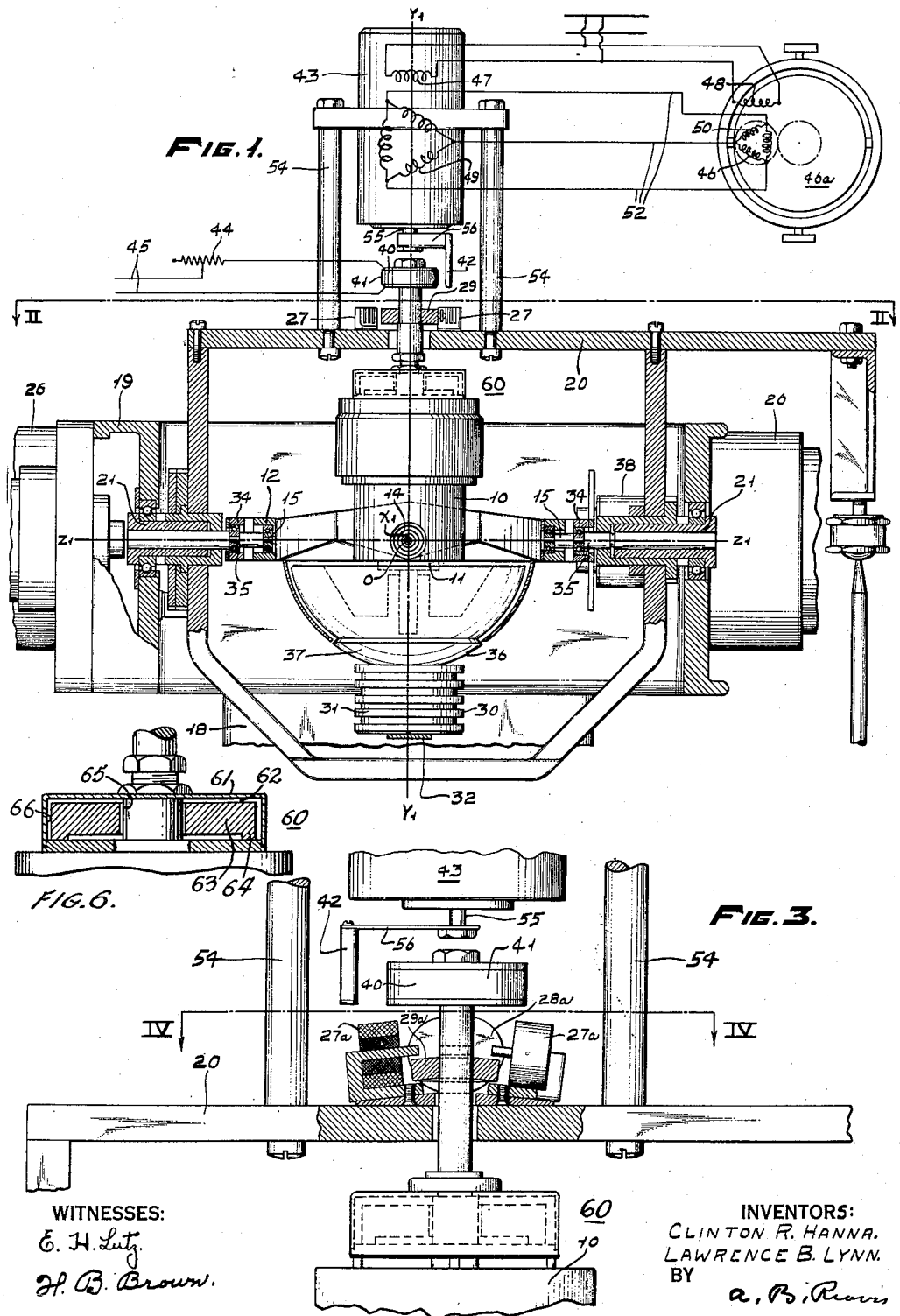
Fig. 1 is a view, partly in section and partly in elevation, showing the improved gyro-vertical.

In the drawings, there is shown a neutral gyro comprising a housing or frame 10 having a motor-operated rotor 11 journaled therein and supported by gimbal means from a suitable supporting structure. The gimbal means includes a gimbal ring 12, inner pivots 14—14 for supporting the housing or frame from the gimbal ring, and outer pivots 15—15 for supporting the gimbal ring from suitable supporting structure. Designating the rotor spin axis as $y_1$—$y_1$, the axis of the inner pivots 14—14 as $x_1$—$x_1$, and the axis of the outer pivots 15—15 as $z_1$—$z_1$, it will be noted that the inner gimbal axis $x_1$—$x_1$ is at right angles both to the outer gimbal axis $z_1$—$z_1$ and the rotor spin axis $y_1$—$y_1$ and that all three of such gyro axes have a common point of intersection 0.

As more fully disclosed in the application aforesaid, the supporting structure comprises a rotatable yoke 18, a cross level ring 19, and a level 20, the level being supported from the cross level by pivots 21—21 and the cross level being supported from the yoke by pivots 22—22. Designating the yoke axis as $y$—$y$, the cross level axis as $x$—$x$ and the level axis as $z$—$z$, such axes have a common point of intersection and the gyro is supported with respect to the supporting structure so that its center 0 is coincident with such point of intersection. The relationship of gyro axes and supporting structure axes such that all of such axes intersect at a common point 0 is indicated by Fig. 5, from which it will also be seen that the cross level and level axes, the gyro gimbal axes, and the erector gimbal axes are in normal planes intersecting at the yoke axis.

With means acting on the gyro to keep the spin axis vertical and with suitable follow-up means controlled by the gyro and capable of moving the cross level and the level about the cross level and level axes, it will be apparent that, irrespective of deviation of the yoke axis from the vertical and occasioned, for example, by rolling and pitching of the ship upon which the yoke is mounted, the cross level is moved about the cross level axis to keep the level axis horizontal and the level is moved about the level axis to maintain a predetermined plane thereof level or horizontal.

As shown, the yoke carries a cross level motor 25 operative to move the cross level about the cross level axis and the cross level carries a level motor 26 operative to move the level about the level axis. The supporting structure, preferably the level 20, carries pick-up devices 27—27 for the cross level servo-motor system and pick-up devices 28—28 for the level servo-motor system. In Figs. 1 and 2, the pick-up devices are variable resistances in direct current circuits of the cross level and level follow-up motors and such devices are operated by the actuator 29 carried by the gyro casing 10 in axial alignment with the spin axis.

Any tendency of the level to deviate from its vertical or horizontal position because of movement about the cross level axis, and in the plane of the level axis, results in actuation of the pick-up devices 27—27 and consequent operation of the cross level motor 25 to move the cross level to maintain the level-axis horizontal and any tendency of the level to deviate because of movement about the level axis and in the plane of the cross level axis results in operation of the pick-up devices 28—28 and consequent operation of the level motor 26 to move the level about the level axis.

Therefore, where the yoke is moved angularly about the cross level and level axes, as would be the case where it is carried by the deck of a ship, then, irrespective of rolling and pitching, the gyro-vertical controls the cross level and level servo-motor systems to move the cross level and level about their axes sufficiently to maintain the level vertical or with a predetermined plane thereof horizontal.

To give the neutral gyro a vertical-seeking tendency, there is provided a magnetic erector, at 30. The erector comprises a magnet 31 pendulously supported so that its axis is in the vertical passing through the gyro center 0. The pendulous mounting is provided by a bail 32 supported by pivots 33—33 from the gimbal ring 34, which is pivoted at 35—35 with respect to the gyro gimbal outer pivots 15—15.

The gyro rotor has a circular coaxial metallic portion 36 rotatable therewith and having a spherical surface 37 whose center is the gyro center and the surface being spaced to define a suitably small air gap with respect to the magnet. With this arrangement, rotation of the flywheel portion 36 in the field of the magnet induces eddy currents therein responsible for magnetic drag exerted on the rotor. As long as the spin axis is vertical, the drag merely applies a torque about the spin axis opposed to the direction of spin; however, deviation of the spin axis from the vertical results in a couple applied to the gyro to precess the latter in opposition to the deviation. For example, assuming deviation from the vertical by movement about the gyro axis $x_1-x_1$, then such deviation results in the magnetic erector applying a couple about the gyro axis $z_1-z_1$ which causes precession about the axis $x_1-x_1$ opposing the deviation. In like manner, deviation from the vertical about the axis $z_1-z_1$ is accompanied by torque applied about the axis $x_1-x_1$ to effect precession in opposition to the deviation. Therefore, deviation of the spin axis about either or both of the gyro gimbal axes results in the application of couple or couples to precess the gyro to the vertical, that is, not only is deviation from the vertical opposed but the spin axis is restored to the vertical.

As the magnet of the erector is pendulously supported in a universal manner with respect to the gyro center 0, self-oscillation of the magnet tends to occur because it is free to react to the electro-magnetic drag which it exerts on the gyro flywheel structure; and, to minimize oscillations on that account, there is provided an eddy current damper 38 effective on the pendulous mounting about the axis of one of the sets of pivots, for example, the pivots 35—35.

Where the gyro and the erector are carried by a cage mounted on the level, the intersection of the gyro axes still coinciding with the intersection of the cross level and level axes, and the cage is slowly rotated to avoid mechanical and thermal errors, as disclosed and claimed in the application of Lynn, Serial No. 607,711, filed July 30, 1945, Patent No. 2,417,081, granted March 11, 1947, and where the bail of the erector magnet pendulous suspension is pivoted directly on the gyro gimbal pivots 15—15, instead of through a gimbal ring, the magnet has freedom of motion and response to gravity only in a plane perpendicular to its suspension axis and it cannot react to the electromagnetic drag and thus pick up energy for self-oscillation from the flywheel. Therefore, the necessity for damping is avoided and it becomes feasible to use a larger erecting current with a consequent larger erecting torque.

In all cases, the gyro center coincides with the point of intersection of the principal axes of the stable element, that is, the cross level and level axes are in planes which intersect at right angles at the train or yoke axis and the coincident gyro center and intersection of the cross level and level axes is on such train or yoke axis; the cross level and level servo-motor means pick-up devices are arranged for actuation by movements in level and cross level planes, respectively; the spherical surface of the erector is centered with respect to the gyro center; and the erecting magnet is pendulously suspended with respect to the gyro center or at least with respect to the outer gimbal axis of the gyro.

In addition to the aforesaid means acting on the neutral gyro in response to gravity to give to the spin axis the tendency to seek a directional position in relation to the earth, more particularly, to seek the vertical, there is provided means for applying torque to the gyro about an axis transverse to the spin axis and in a north-south plane to correct for the effect of earth's rotation on the gyro, the torque-applying means being variable to suit the latitude.

The torque about an axis transverse to the spin axis is preferably applied by magnetic means comprising a winding component and an armature or magnet component, one of the components being cylindrical and attached to the gyro frame 10 and the other component being movable about the cylindrical component to vary the position of the torque plane. For example, there is shown a cylindrical component 40 carried by the gyro frame 10 in axial alignment with the spin axis and providing with a winding 41, the core structure and winding constituting a cylindrical electromagnet. The armature or magnet bar 42 is supported from the level 20 by a motor 43 which is operated to move the armature or bar about the magnet to maintain the plane of the applied torque in the north-south plane.

The magnetic torque is varied to suit the latitude, this purpose being achieved, for example, by the variable resistance 44 in the winding circuit 45. Where the spin axis directional position is the vertical, it will be apparent that the tendency of the earth's rotation is to deviate the spin axis from the vertical or directional position, this tendency increasing from the poles toward the equator. Therefore, where this apparatus forms a part of a gyro-vertical, the resistance is adjusted to increase the excitation of the winding as the equator is approached. Furthermore, the resistance may be located remotely in relation to the gyro with obvious operating advantages over the old arrangement of an adjustable weight carried directly by the gyro to compensate for earth's rotation.

In order that the motor 43 may function to keep the armature in a north-south plane, it is of the synchronous type and is connected to a suitable generator 46 operated by the compass, at 46a. As shown, the synchro-motor 43 and the synchro-generator 46 have single-phase windings 47 and 48 and three-phase windings 49 and 50, respectively. The single-phase windings are excited from a suitable source of single-phase alternating current and the three-phase windings are joined by the three-phase line 52. The synchronous connection serves to keep the armature matched with the compass to maintain the armature in a meridian plane. With a change in course of the ship, the armature would be correspondingly changed but for the synchronous connection to the compass, the synchro-generator voltage energizing the synchro-motor to keep the armature matched with the compass, that is, in the north-south plane.

The synchro-motor 43 is preferably mounted on the level 20 by means of supporting or bracket structure 54, the motor being mounted so that its rotor 55 is axially aligned with the spin axis with the level horizontal and the spin axis vertical. The rotor 55 has a non-magnetic crank arm 56 carrying the armature or magnet bar.

While it is immaterial what kind of electrical follow-up system is operated by the gyro to control the cross level and level motors, in Figs. 1 and 2, the pick-up devices 27—27 and 28—28 control the supply of direct current to the motors 25 and 26, respectively, for operation of the latter in either direction, dependent upon departure from the vertical; and, in Figs. 3 and 4, there are shown magnetic pick-up devices 27a—27a and 28a—28a for cross level and level follow-up systems of the alternating current type, such pick-up devices having their magnetic reluctances varied by means of the armature element 29a which cooperates with air gaps thereof.

The frame or casing 10 for the rotor is provided with a damper, at 60, to dissipate nutational vibration energy. The damper includes a casing 61 carried by the rotor frame or casing above the rotor and providing an annular chamber 62 coaxial with the spin axis and within which is located an annular inertia member or mass 63, preferably having an outer annular rib 64 at its lower side and adapted to bear on the normally horizontal bottom surface of the chamber. The inertia member or mass 63 has clearance with respect to the inner and outer peripheral walls 65 and 66 of the chamber as well as with respect to the top and the bottom wall except for the rib bearing area on the latter. It will be apparent that the inertia of the mass 63 is effective horizontally and rotationally, any movement of the casing being opposed by the inertia of the mass to the extent of the frictional resistance between the mass and the chamber bottom. Hence, the apparatus functions as a damper to dissipate or absorb vibration energy by friction with the result that nutational effects are minimized. The damper is useful to absorb nutational vibrations where the gyro has its spin axis constrained to its vertical position, this being particularly true in the apparatus illustrated and described and in which the erector takes the form of a pendulous member which acts across clearance with respect to the lower portion of the rotor to cause the latter to act gyroscopically to return the spin axis to vertical in the event of departure thereof therefrom.

While the invention has been shown in several forms, it will be obvious to those skilled in the art that it is not so limited, but is susceptible of various other changes and modifications without departing from the spirit thereof.

What is claimed is:

1. In a neutral gyro, a rotor assembly comprising a frame or casing carrying a rotor, a pendulous erector cooperating with the rotor to bring the spin axis to vertical position, a damper for damping pendulous movements of the erector and operative independently of the gyro, and a damper for minimizing nutational movements of the gyro, said nutational damper comprising means carried by the frame or casing above the rotor and providing an annular chamber coaxial with the rotor spin axis and having a horizontal interior bottom surface and an annular inertia member within the chamber, bearing on said bottom surface, and having clearance with respect to the inner, outer and top walls of the chamber so as to be capable of movement relative to the casing in response to nutational vibratory motion to frictionally dissipate the nutational vibratory energy.

2. In gyro apparatus, a support movable angularly with respect to the earth; an operated member; a neutral gyro; gimbal means for supporting the gyro and the operated member from the support; gravity-responsive means carried by the gimbal means and acting on the gyro so that the spin axis has a directive effect in relation to the earth; follow-up means responsive to the gyro to move the operated member relative to the support to maintain its position irrespective of angular movement of the later; electromagnetic means operative independently of said gravity-responsive means for exerting torque on the gyro in a north-south plane and about an axis transverse to the spin axis to minimize deviation of the latter from its directing position; said electromagnetic means including a pair of permeable magnetic flux path components, which are carried, respectively, by the operated member and by the gyro and are separated by an air gap, and a flux-producing winding carried by one of said components; and means for varying the exciting current of said winding so as to correct substantially for variation in latitude.

3. In gyro apparatus, a support movable angularly with respect to the earth; a neutral gyro; an operated member; gimbal means for supporting the gyro and the operated member from the support; gravity-responsive means carried by said gimbal means and acting on the gyro to cause the spin axis to seek a directing position in relation to the earth; follow-up means responsive to the gyro to move the operated member relative to the support to maintain its position irrespective of angular movement of the latter; electromagnetic means for exerting torque on the gyro about an axis transverse to the spin axis; said electromagnetic means including a pair of winding and armature components of which one is cylindrical and the other is arranged for movement thereabout in spaced relation thereto; means for mounting the cylindrical component on the gyro in coaxial relation with the rotor spin axis; means including a motor for mounting the other component on the operated member and the motor being operative to move said other component about the cylindrical component to locate the torque in a north-south plane; and means for varying the exciting current of the winding to correct for variation in latitude.

4. In gyro apparatus, a support movable angularly with respect to the earth; an operated member; a neutral gyro; gimbal means for supporting the gyro and operated member from the support; gravity-responsive means carried by the gimbal means and acting on the gyro in response to departure of the spin axis from the vertical to cause it to precess to oppose such departure and to restore the spin axis to vertical; means for exerting torque on the gyro in a north-south plane to cause it to precess in the east-west plane to compensate for the effect of earth's rotation to maintain the spin axis vertical; said last-named means including a pair of spaced components carried by the gyro and by the operated member and which cooperate to provide a magnetic flux circuit such that the flux exerts attractive force to provide said torque; and means providing for magnetic flux in said circuit.

5. Apparatus as claimed in claim 4 with means providing for variation of the flux of said circuit to vary the attractive force to suit the latitude so that the gyro may be caused to precess in an east-west plane at the same rotational velocity as that of the earth and in the same direction as that of the latter.

6. In gyro apparatus, a support movable angularly relative to the earth; a level member; a neutral gyro comprising a frame and a rotor journaled in the frame; gimbal means for supporting the level member and the gyro from the support; gravity-responsive means carried by the gimbal means and acting on the gyro in response to departure of the rotor spin axis from vertical to apply torque thereto to cause the gyro to precess to oppose such departure and to restore the spin axis to vertical; follow-up means responsive to the gyro to move the level member relative to the support to maintain its position irrespective of angular movement of the latter; electromagnetic means for exerting attractive force on the gyro in a north-south plane to cause it to precess in the east-west plane to maintain the spin axis vertical; said electromagnetic means comprising a winding component and an armature component cooperating therewith to develop the attractive magnetic force and one of said components being cylindrical; means for mounting the cylindrical component on the gyro frame in coaxial relation with the rotor spin axis; means including a motor for mounting the other component on the level member and the motor being operative to move such other component about the cylindrical component so that the attractive magnetic force may be exerted on the gyro in the north-south plane; and means providing exciting current for the winding of the winding component.

7. In gyro apparatus, a support movable angularly with respect to the earth; a level member; a neutral gyro including a casing and a rotor journaled therein; a pendulous member; gimbal means for supporting the level and pendulous members and the gyro from the support; means carried by the pendulous member and acting on the gyro to cause the rotor spin axis to precess to the vertical; the last-named means comprising an electromagnet carried by the pendulous member and a circular metallic member forming a coaxial part of the gyro rotor and rotated contiguously to the electromagnet to produce, dependent upon the deviation of the rotor spin axis from vertical and due to eddy current action, a couple acting on the gyro to precess the spin axis to vertical, whereby deviation of the spin axis from vertical is opposed and such spin axis is returned to vertical; electromagnetic means for exerting torque on the gyro in a north-south plane to cause the gyro to precess in the east-west plane; said electromagnetic means including a pair of winding and armature components of which one is cylindrical and the other is arranged for movement thereabout in spaced relation thereto; means for mounting the cylindrical component on the gyro and in coaxial relation with the rotor spin axis; means including a motor for mounting the other component on the level member and the motor being operative to move such other component about the cylindrical component to locate the torque in a north-south plane; and means for varying the exciting current of the winding component to correct for variation in latitude.

8. In gyro apparatus, a support movable angularly with respect to the earth; a level member; a neutral gyro comprising a frame or casing and a rotor journaled in the latter; a pendulous member; gimbal means for supporting the level and pendulous members and the frame from said support; means carried by the pendulous member and acting on the gyro to cause the spin axis to seek the vertical and comprising an electromagnet carried by the pendulous member and a circular metallic member forming a coaxial part of the gyro motor and provided with a spherical surface rotatable contiguously to the electromagnet to produce, dependent upon deviation of the rotor spin axis from vertical and due to eddy current action, a couple acting on the gyro to precess the spin axis to vertical, whereby deviation of the spin axis from vertical is opposed and return of such axis to vertical is effected; follow-up means responsive to the gyro to move the level member relative to the support to maintain its position irrespective of angular movement of such support; electromagnetic means for applying torque to the frame about an axis transverse to the spin axis; said electromagnetic means comprising a cylindrical winding component and an armature component movable thereabout in spaced relation thereto; means for mounting the cylindrical component on said gyro frame in axial alignment with the rotor spin axis; means including a motor for mounting the armature component on the level member and the motor being operative to move the latter component about the cylindrical component to locate the magnetic torque in a north-south plane; and means providing, with the magnetic torque effective in the north-south plane, for variation of the excitation of the winding component to provide a torque which is adequate for precession of the gyro to compensate for the effect of earth's rotation to maintain the rotor spin axis vertical.

9. In gyro apparatus, a support movable angularly with respect to the earth; a level member; a neutral gyro comprising a frame and a rotor journaled in the frame; a pendulous bail; gimbal means for supporting the level member, gyro and the bail from the support; an electromagnet pendulously suspended by the bail so that normally its axis is in the vertical passing through the gyro center; a circular metallic member forming a coaxial part of the rotor and provided with a spherical surface rotatable contiguously to the electro-magnet to produce, dependent upon deviation of the spin axis from vertical and due to eddy current action, a couple acting on the gyro to precess the spin axis to vertical, whereby deviation of the spin axis from vertical is opposed and return of such axis to vertical is effected; means acting on the bail independently of the gyro to damp oscillatory movements of the bail and the electromagnet carried thereby; electromagnetic means for applying torque to the gyro in a north-south plane to cause the latter to precess in the east-west plane; said electromagnetic means including a cylindrical winding component and an armature component movable about the latter in spaced relation thereto; means for mounting the cylindrical component on said gyro frame in axial alignment with the rotor spin axis; means including a motor for mounting the armature component on the level member and the motor being operative to locate said torque in a north-south plane; and means for varying the excitation of the winding of the winding component so that the gyro may be caused to precess in the east-west plane at the same rotational velocity as the earth and in the same direction as that of the earth.

10. In a gyro-vertical, the combination of, a neutral gyro comprising a casing and a rotor journaled therein; a pendulous member mounted so as to be capable of pendulous movement independently of the gyro; a damper for the pendulous member and operative independently of the gyro; erecting means including the pendulous member, components carried by the pendulous member and by the gyro, respectively, and means providing for energization of the pendulous-member-carried component for action on the gyro-carried component so that the pendulous member may be effective to cause the rotor spin axis to precess to the vertical; and a frictional damper for damping nutational movements of the gyro; said frictional damper comprising an annular inertia member arranged coaxially of the gyro spin axis and means carried by the gyro casing and providing a normally horizontal bearing surface for the inertia member; said bearing surface and inertia member being relatively movable in response to nutational movement of the gyro to effect dissipation of nutational energy in friction between the inertia member and the bearing surface.

CLINTON R. HANNA.
LAWRENCE B. LYNN.

REFERENCES CITED

The following references are of record in the file of this patent:

UNITED STATES PATENTS

| Number | Name | Date |
|---|---|---|
| 1,141,099 | Anschutz-Kaempfe | June 1, 1915 |
| 1,183,745 | Ledyard | May 16, 1916 |
| 2,133,793 | Anscott et al. | Oct. 18, 1938 |
| 2,133,809 | Carter et al. | Oct. 18, 1938 |
| 2,158,048 | Braddon | May 9, 1939 |
| 2,190,698 | Carter | Feb. 20, 1940 |
| 2,293,092 | Wittkuhns | Aug. 18, 1942 |
| 2,328,744 | Rotors | Sept. 7, 1943 |
| 2,411,087 | Ford et al. | Nov. 12, 1946 |
| 2,417,081 | Lynn | Mar. 11, 1947 |